United States Patent
Shidore et al.

(10) Patent No.: US 11,639,110 B2
(45) Date of Patent: May 2, 2023

(54) ELECTRIFIED DRIVETRAIN FOR A VEHICLE

(71) Applicant: GM GLOBAL TECHNOLOGY OPERATIONS LLC, Detroit, MI (US)

(72) Inventors: Neeraj S. Shidore, Novi, MI (US); Madhusudan Raghavan, West Bloomfield, MI (US); Norman K. Bucknor, Troy, MI (US); Vicente Domenech-Llopis, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 595 days.

(21) Appl. No.: 16/787,686

(22) Filed: Feb. 11, 2020

(65) Prior Publication Data

US 2021/0245603 A1 Aug. 12, 2021

(51) Int. Cl.
*B60L 1/00* (2006.01)
*B60K 1/02* (2006.01)
(Continued)

(52) U.S. Cl.
CPC .......... *B60L 1/003* (2013.01); *B60H 1/00385* (2013.01); *B60H 1/3222* (2013.01); *B60K 1/02* (2013.01); *B60K 17/02* (2013.01); *B60K 23/06* (2013.01); *B60L 1/20* (2013.01); *B60L 15/38* (2013.01); *H02K 7/116* (2013.01); *B60L 50/51* (2019.02); *B60L 50/60* (2019.02)

(58) Field of Classification Search
CPC . B60L 1/003; B60L 1/20; B60L 15/38; B60H 1/00385; B60H 1/00392; B60K 1/02; B60K 17/02; B60K 23/06
See application file for complete search history.

(56) References Cited

U.S. PATENT DOCUMENTS 3,451,469 A * 6/1969 Leslie ...................... B60H 1/16
165/41
4,037,994 A * 7/1977 Bird .................. A61M 16/0063
417/440

(Continued)

FOREIGN PATENT DOCUMENTS

DE 102009031645 A1 1/2011
DE 112011102477 T5 5/2013
(Continued)

*Primary Examiner* — Frank B Vanaman
(74) *Attorney, Agent, or Firm* — Quinn IP Law

(57) ABSTRACT

An electrified drivetrain for a vehicle includes a first electric machine, a second electric machine, a clutch, an HVAC compressor, and a controller. The second electric machine is rotatably coupled to a geartrain, the first electric machine is rotatably coupled to the HVAC compressor, and is rotatably couplable to the geartrain via the clutch, and the clutch is operative in a first state and a second state. The first electric machine is rotatably coupled to the geartrain when the clutch is controlled to the first state, and is decoupled from the geartrain when the clutch is controlled to the second state. The controller is operatively connected to the first and second electric machines, the clutch, and the HVAC compressor to control operation of the electrified drivetrain. The first electric machine can be used as a heater element and to provide mechanical power to the drivetrain.

18 Claims, 1 Drawing Sheet

(51) Int. Cl.
  *B60K 17/02*    (2006.01)
  *B60K 23/06*    (2006.01)
  *B60L 15/38*    (2006.01)
  *B60H 1/00*     (2006.01)
  *B60H 1/32*     (2006.01)
  *H02K 7/116*    (2006.01)
  B60L 50/60      (2019.01)
  B60L 50/51      (2019.01)

(56) References Cited

U.S. PATENT DOCUMENTS

| | | | | | |
|---|---|---|---|---|---|
| 4,335,429 | A | * | 6/1982 | Kawakatsu | B60T 1/10 |
| | | | | | 180/65.23 |
| 5,488,837 | A | * | 2/1996 | Sekino | B60L 1/02 |
| | | | | | 62/244 |
| 5,647,534 | A | * | 7/1997 | Kelz | B60L 3/0061 |
| | | | | | 165/80.4 |
| 5,679,087 | A | * | 10/1997 | Lutz | F16H 57/082 |
| | | | | | 475/346 |
| 2003/0090225 | A1 | * | 5/2003 | Posma | B60L 50/52 |
| | | | | | 318/376 |
| 2007/0199339 | A1 | * | 8/2007 | Ishihara | H02K 9/225 |
| | | | | | 62/505 |
| 2012/0221197 | A1 | * | 8/2012 | Hisada | B60L 1/003 |
| | | | | | 74/665 F |

FOREIGN PATENT DOCUMENTS

| DE | 112011102566 T5 | 8/2013 |
|---|---|---|
| DE | 102017223114 A1 | 6/2019 |

* cited by examiner

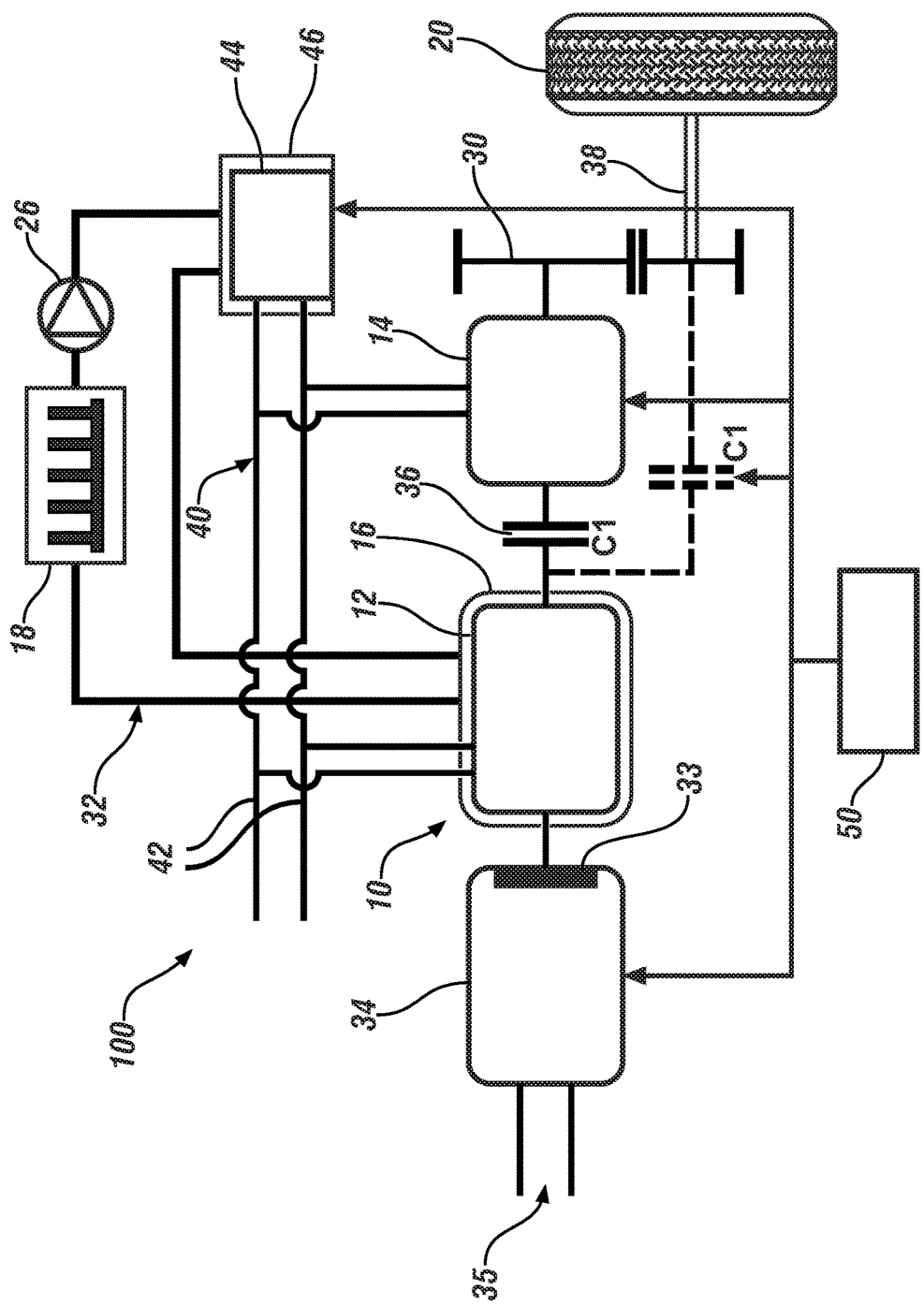

ELECTRIFIED DRIVETRAIN FOR A VEHICLE

INTRODUCTION

Vehicles employing electrified drivetrains require on-board devices that provide accessory functions, such as HVAC (heating-ventilation-air conditioning) devices that include air conditioning compressors and heater cores. On vehicles that employ internal combustion engines, such functions are provided by accessory devices that are driven by accessory belt drives and by coolant circulation systems including radiators and other heat exchangers. On an electrified vehicle, coolant circulation systems and accessory belt drive systems may be unavailable, and such functions may be provided by individual systems, including, e.g., a stand-alone electric machine that drives an air conditioning compressor and an electrically-powered radiant heat generator. Such individual systems consume packaging space, increase complexity of wiring harnesses, add weight to the vehicle, and add costs.

SUMMARY

The concepts described herein provide a creative arrangement of an electrified drivetrain for a vehicle that includes a first electric machine, a second electric machine, a clutch, an HVAC compressor, and a controller. The second electric machine is rotatably coupled to a geartrain, the first electric machine is rotatably coupled to the HVAC compressor, and is rotatably couplable to the geartrain via the clutch, and the clutch is operative in a first state and a second state. The first electric machine is rotatably coupled to the geartrain when the clutch is controlled to the first state, and is decoupled from the geartrain when the clutch is controlled to the second state. The controller is operatively connected to the first and second electric machines, the clutch, and the HVAC compressor to control operation of the electrified drivetrain.

An aspect of the disclosure includes the first electric machine being rotatably coupled to the geartrain via the second electric machine when the clutch is controlled to the first state.

Another aspect of the disclosure includes the first electric machine being directly rotatably coupled to the geartrain when the clutch is controlled to the first state.

Another aspect of the disclosure includes the controller controlling the first electric machine and an HVAC clutch to operate the HVAC compressor.

Another aspect of the disclosure includes the controller controlling the first electric machine to generate tractive torque that is transferred to the geartrain.

Another aspect of the disclosure includes a coolant circuit including a first cooling jacket that is in thermal contact with the first electric machine, a cabin heat exchanger and a second coolant jacket that is in thermal contact with the DC power source, wherein the controller is operable to control the first electric machine to generate thermal energy that is recoverable by the coolant circuit.

Another aspect of the disclosure includes the controller being operable to control the first electric machine to generate thermal energy that is recoverable by the coolant circuit, including the controller being operable to control the first electric machine to power the HVAC compressor under a deadhead state.

Another aspect of the disclosure includes the controller controlling the first electric machine to operate the HVAC compressor and to generate tractive torque that is transferred to the geartrain.

Another aspect of the disclosure includes the controller controlling the first electric machine to operate the HVAC compressor and to generate thermal energy that is recoverable by the coolant circuit.

Another aspect of the disclosure includes the controller controlling the first electric machine to generate tractive torque that is transferred to the geartrain and to generate thermal energy that is recoverable by the coolant circuit.

Another aspect of the disclosure includes the controller controlling the first electric machine to operate the HVAC compressor, and to generate tractive torque that is transferred to the geartrain, and to generate thermal energy that is recoverable by the coolant circuit.

Another aspect of the disclosure includes the controller controlling the first electric machine in a freewheel state.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawing, in which:

FIG. 1 schematically shows an embodiment of an electrified drivetrain for a vehicle, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. Furthermore, there is no intention to be bound by any expressed or implied theory presented in the preceding technical field, background, brief summary or the following detailed description. Furthermore, it should be understood that throughout the drawings, corresponding reference numerals indicate like or corresponding parts and features. The terms "first", "second" and the like are employed to distinguish like elements, and do not denote an order, quantity, priority or importance. The terms "a" and "an" and the like are employed to denote the presence of at least one of the referenced items, and do not denote a limitation of quantity.

Referring to the drawing, FIG. 1 schematically illustrates an embodiment of an electrified drivetrain 10 for a vehicle 100. The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The electrified drivetrain 10 is mechanically rotatably coupled to a geartrain 30 to transfer mechanical power to one or a plurality of drive wheel(s) 20 of the vehicle 100, and operation thereof is monitored and controlled by a controller 50. The controller 50 may be configured as a single controller, or, alternatively as a plurality of controllers that are arranged to monitor inputs from sensors and execute algorithms to control actuators in response to operator commands. Electric power is supplied by a high-voltage electric power system 40, which includes a DC power source 44 and a high-voltage bus 42.

The electrified drivetrain 10 includes a first electric machine 12 and a second electric machine 14, wherein the second electric machine 14 is rotatably coupled to the geartrain 30, and the first electric machine 12 is rotatably couplable to the second electric machine 14 via activation of clutch Cl 36 (depicted by a solid line), or, alternatively, the first electric machine 12 is rotatably couplable to the geartrain 30 via activation of clutch Cl 36 (depicted by a dashed line). The clutch Cl 36 is operative in either a first state or a second state. When the clutch Cl 36 is controlled to the first state, the first electric machine 12 is rotatably coupled to the second electric machine 14. When the clutch Cl 36 is controlled to the second state, the first electric machine 12 is decoupled from the second electric machine 14. In the alternative embodiment, When clutch Cl 36 is controlled to the first state, the first electric machine 12 is directly rotatably coupled to the geartrain 30, and when the clutch Cl 36 is controlled to the second state, the first electric machine 12 is rotatably decoupled from the geartrain 30, and thus is decoupled from the second electric machine 14.

The geartrain 30 includes any of or a combination of a single gear, meshed gears, differential gears, clutches, pulleys, chain drives, etc. that are arranged to provide speed and/or torque conversion between the first and second electric machines 12, 14 and a driveline 38.

The driveline 38 is disposed to transfer tractive torque between the geartrain 30 and the drive wheel(s) 20 via an axle, a differential gearset, or another device. The driveline 38 may be arranged in a single-wheel configuration, a front-wheel drive configuration, a rear-wheel drive configuration, a four-wheel drive configuration, an all-wheel drive configuration, or another suitable configuration. The driveline 38 is configured to transfer tractive power between the first and/or second electric machines 12, 14, the geartrain 30, and a road surface via the drive wheel(s) 20. The driveline 38 is illustrative, and the concepts described herein apply to other drivetrain systems.

The first and second electric machines 12, 14 are configured as multi-phase electric motor/generators, and may include any motor/generator device that is capable of operating as a motor to generate torque or as a generator to generate electric power. For example, the first and second electric machines 12, 14 may be configured as multi-phase brushless electric motor-generators or similar devices. In one embodiment, the second electric machine 14 is arranged to provide tractive power for vehicle propulsion. In one embodiment, the first electric machine 12 is sized for providing accessory power. The first and second electric machines 12, 14 are electrically connected to respective power inverters (not shown), which may be integrated or stand-alone devices. Each power inverter may be configured with a controller and control circuits including power transistors, e.g., integrated gate bipolar transistors (IGBTs) for transforming DC electric power to AC electric power and transforming AC electric power to DC electric power. The controller may employ pulsewidth-modulating (PWM) control of the IGBTs to convert stored DC electric power originating in the DC power source 44 to AC electric power to drive the respective first or second electric machine 12, 14 to generate torque. Similarly, the controller may employ PWM control of the IGBTs to convert mechanical power transferred to the respective first or second electric machine 12, 14 to DC electric power to generate electric energy that is storable in the DC power source 44, including as part of a regenerative braking control strategy. The controller of the inverter receives motor control commands from the controller 50 and controls inverter states to provide a desired motor drive operation or a regenerative braking operation. The generated electric power can be stored in the DC power source 44 or supplied as current to provide electric power to an auxiliary electric system, such as a radiant heat exchanger. The first and second electric machines 12, 14 may include other electrical devices, including, e.g., one or more of a motor position sensor, a temperature sensor, a current sensor, a voltage sensors, etc. The first and second electric machines 12, 14, may include thermal management components to cool the first and second electric machines 12, 14 and the electrical components, etc. In one embodiment, the thermal management components may include a first cooling jacket 16 that is disposed around an outer housing of the stator of the first electric machine 12.

The DC power source 44 is arranged to supply electric power at a suitable voltage level, and may include, e.g., a multi-cell lithium ion device, an ultra-capacitor, or another device. Monitored parameters related to the DC power source 44 may include a state of charge (SOC), device temperature, etc. In one embodiment, the DC power source 44 may electrically connect via an on-vehicle battery charger to a remote, off-vehicle electric power source for charging while the vehicle 100 is stationary. The DC power source 44 may be configured at a nominal 48-volt DC voltage level in one embodiment. Alternatively, the DC power source 48 may be configured at a nominal 300 volt DC voltage level, or another suitable voltage level, as may be selected.

The thermal management components are elements of a coolant circuit 32 that includes, in one embodiment, the first cooling jacket 16 that is in thermal contact with the first electric machine 12, a cabin heat exchanger 18, and a second coolant jacket 46 that is in thermal contact with the DC power source 44. The first cooling jacket 16 is fluidly connected to the cabin heat exchanger 18 and the second coolant jacket 46 disposed on the DC power source 44 via a fluidic coolant circuit 32. The fluidic coolant circuit 32 includes, in one embodiment, a fluidic pump 26 and a reservoir for circulating fluidic coolant therein.

The first electric machine 12 is rotatably coupled to an HVAC compressor 34, and rotatably couplable to the geartrain 30 via the clutch 36, either directly or, alternatively, via the second electric machine 14. The HVAC compressor 34 is an element of an HVAC system 35, and is configured as a mechanical scroll compressor in one embodiment, or a piston type compressor in another possible embodiment. The operation of the HVAC compressor 34 is controlled via a controllable clutch 33 that is controlled by the controller 50. The HVAC compressor 34 is rotatably coupled to the first electric machine 12 via a rotatable shaft, a gear drive, a belt drive, or another torque transfer device.

The controller 50 may communicate with an operator interface (not shown), and operates to provide hierarchical control of a plurality of control devices to effect operational control of individual elements, including, e.g., the first and second electric machines 12, 14, the DC power source 44, the clutch Cl 36, and the HVAC clutch 33, either directly or via a communication bus to monitor operation and control operations thereof. The first electric machine 12 may be a multi-use electric motor that may be utilized as a traction motor coupled to the driveline 38, as a compressor motor coupled to the HVAC compressor 34, and as an electric heating device via the coolant circuit 32, either coincidently, individually, or in any combination.

The controller 50 is operatively connected to the first and second electric machines 12, 14, the clutch 36, and the HVAC clutch 33 to control operation of the electrified drivetrain 10 in response to prescribed conditions.

The controller 50 controls the first electric machine 12 to generate torque and activates the HVAC clutch 33 to operate the HVAC compressor 34 under a prescribed condition.

The controller 50 controls the first electric machine 12 to generate torque that is transferred to the driveline 38 via the geartrain 30 under a prescribed condition.

The controller 50 controls the first electric machine 12 to generate thermal energy that is recoverable by the coolant circuit 32 under a prescribed condition. This may include, by way of non-limiting examples, operating the first electric machine 12 under suboptimal electrical flux conditions, operating the compressor in a dead-head state, and controlling the first electric machine 12 in a regenerative braking state while operating the second electric machine 14 to generate tractive torque.

The controller 50 controls the first electric machine 12 to operate the HVAC compressor 34 by activating the HVAC clutch 33 and simultaneously controls the second electric machine 14 to generate tractive torque that is transferred to the driveline 38 via the geartrain 30 under a prescribed condition.

The controller 50 controls the first electric machine 12 to operate the HVAC compressor 34 by activating the HVAC clutch 33 and simultaneously controls the first electric machine 12 to generate thermal energy that is recoverable by the coolant circuit 32 under a prescribed condition.

The controller 50 controls the second electric machine 14 to generate torque that is transferred to the driveline 38 via the geartrain 30, and simultaneously controls the first electric machine 12 to generate thermal energy that is recoverable by the coolant circuit 32 under a prescribed condition.

The controller 50 controls the first electric machine 12 to operate the HVAC compressor 34 by activating the HVAC clutch 33, simultaneously controls the first electric machine 12 to generate tractive torque that is transferred to the driveline 38 via the geartrain 30, and simultaneously controls the first electric machine 12 to generate thermal energy that is recoverable by the coolant circuit 32 under a prescribed condition. In this way, the controller 50 arbitrates between a request for tractive effort, a request for thermal heat generation in-cabin, and a request for compressor action such as for defrosting effort, and also arbitrates between the first and second electric machines 12, 14 to provide vehicle tractive effort in a manner that optimizes system efficiencies.

The controller 50 controls the first electric machine 12 in a freewheel state under a prescribed condition, with all mechanical torque for the driveline 38 and the HVAC compressor 34, including parasitic losses, being provided by the first electric machine 12.

One potential result of configuring and controlling the electrified drivetrain 10 as described herein includes an expected improvement in vehicle operating range at cold ambient temperatures as a result of improved component and system heating using regenerative braking energy that would otherwise be lost when the DC power source 44 is at a high SOC state. This includes operating the first electric machine 12 as a heat pump to provide cabin heating. Furthermore, when the vehicle 100 is at an autostop state, the first clutch 36 may be controlled to the first state, and the current flow from the first electric machine 12 is controlled so it becomes a heating element, with the heat being transferred into the coolant circuit 32. When the vehicle 100 is operating with the DC power source 44 at high SOC under cold ambient temperature conditions, the second electric machine 14 is controlled to recapture energy that would otherwise be wasted. Another potential result of configuring and controlling the electrified drivetrain 10 as described herein includes an expected improvement in the vehicle operating range at mild ambient temperatures.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or FIGURES are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electrified drivetrain for a vehicle, comprising:
   a first electric machine, a second electric machine, a clutch, a coolant circuit, a HVAC (heating-ventilation-air conditioning) compressor, and a controller;
   wherein the coolant circuit includes a first cooling jacket that is in thermal contact with the first electric machine, a cabin heat exchanger, and a second coolant jacket that is in thermal contact with a DC power source;
   wherein the second electric machine is rotatably coupled to a geartrain;
   wherein the first electric machine is rotatably coupled to the HVAC compressor, and is rotatably couplable to the geartrain via the clutch;
   wherein the clutch is operative in a first state and a second state;
   wherein the first electric machine is rotatably coupled to the geartrain when the clutch is controlled to the first state;
   wherein the first electric machine is decoupled from the geartrain when the clutch is controlled to the second state;
   wherein the controller is operatively connected to the first and second electric machines, the clutch, and the HVAC compressor to control operation of the electrified drivetrain; and
   wherein the controller is operable to control the first electric machine to power the HVAC compressor under a deadhead state to generate thermal energy that is recoverable by the coolant circuit.

2. The electrified drivetrain of claim 1, comprising the first electric machine being rotatably coupled to the geartrain via the second electric machine when the clutch is controlled to the first state.

3. The electrified drivetrain of claim 1, comprising the first electric machine being directly rotatably coupled to the geartrain when the clutch is controlled to the first state.

4. The electrified drivetrain of claim 1, wherein the controller controls the first electric machine and an HVAC clutch to operate the HVAC compressor.

5. The electrified drivetrain of claim 1, wherein the controller controls the first electric machine to generate tractive torque that is transferred to the geartrain.

6. The electrified drivetrain of claim 1, wherein the controller controls the first electric machine to operate the HVAC compressor and to generate tractive torque that is transferred to the geartrain.

7. The electrified drivetrain of claim 1, wherein the controller controls the first electric machine to generate tractive torque that is transferred to the geartrain and to generate thermal energy that is recoverable by the coolant circuit.

8. The electrified drivetrain of claim 1, wherein the controller controls the first electric machine to operate the HVAC compressor, and to generate tractive torque that is transferred to the geartrain, and to generate thermal energy that is recoverable by the coolant circuit.

9. The electrified drivetrain of claim 1, wherein the controller controls the first electric machine in a freewheel state.

10. An electrified drivetrain for a vehicle, comprising:
    a first electric machine, a second electric machine, a clutch, a controller, and an HVAC compressor;
    wherein the first electric machine includes a coolant circuit, and wherein the first electric machine operates to generate thermal energy that is recoverable by the coolant circuit;
    wherein the coolant circuit includes a first cooling jacket that is in thermal contact with the first electric machine, a cabin heat exchanger, and a second coolant jacket that is in thermal contact with a DC power source;
    wherein the second electric machine is rotatably coupled to a geartrain;
    wherein the first electric machine is rotatably coupled to the HVAC compressor, and is rotatably couplable to the geartrain via the clutch;
    wherein the first electric machine is rotatably coupled to the geartrain when the clutch is controlled to a first state;
    wherein the first electric machine is decoupled from the geartrain when the clutch is controlled to a second state;
    wherein the first electric machine operates to generate torque that is transferred to the HVAC compressor, operates to generate torque that is transferred to the geartrain, and operates to generate thermal energy that is recoverable by the coolant circuit; and
    wherein the controller is operable to control the first electric machine to power the HVAC compressor under a deadhead state to generate thermal energy that is recoverable by the coolant circuit.

11. The electrified drivetrain of claim 10, comprising the first electric machine being rotatably coupled to the geartrain via the second electric machine when the clutch is controlled to the first state.

12. The electrified drivetrain of claim 10, comprising the first electric machine being directly rotatably coupled to the geartrain when the clutch is controlled to the first state.

13. The electrified drivetrain of claim 10, wherein the controller controls the first electric machine and an HVAC clutch to operate the HVAC compressor.

14. The electrified drivetrain of claim 10, wherein the controller controls the first electric machine to generate tractive torque that is transferred to the geartrain.

15. The electrified drivetrain of claim 10, wherein the controller controls the first electric machine to operate the HVAC compressor and to generate tractive torque that is transferred to the geartrain.

16. The electrified drivetrain of claim 10, wherein the controller controls the first electric machine to generate tractive torque that is transferred to the geartrain and to generate thermal energy that is recoverable by the coolant circuit.

17. The electrified drivetrain of claim 10, wherein the controller controls the first electric machine to operate the HVAC compressor, and to generate tractive torque that is transferred to the geartrain, and to generate thermal energy that is recoverable by the coolant circuit.

18. The electrified drivetrain of claim 10, wherein the controller controls the first electric machine in a freewheel state.

* * * * *